(12) United States Patent
Kawachi

(10) Patent No.: US 6,500,085 B2
(45) Date of Patent: Dec. 31, 2002

(54) MECHANICAL DEVICE FOR TRANSMITTING POWER

(75) Inventor: Masaki Kawachi, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/783,221

(22) Filed: Feb. 15, 2001

(65) Prior Publication Data

US 2001/0016529 A1 Aug. 23, 2001

(30) Foreign Application Priority Data

Feb. 18, 2000 (JP) ........................................ 2000-040922

(51) Int. Cl.⁷ .............................. F16D 7/20; F16D 7/00; F16H 7/20
(52) U.S. Cl. .......................... 474/199; 464/30; 474/166
(58) Field of Search ............................ 474/94, 199, 84, 474/166, 70, 135, 133, 136; 417/223, 319; 192/84.961, 200, 209, 842; 464/30, 59, 60, 77, 89

(56) References Cited

U.S. PATENT DOCUMENTS 5,405,296 A * 4/1995 Cerny et al. .................. 464/89
5,899,811 A * 5/1999 Kishibuchi et al. ........... 464/30
6,120,257 A * 9/2000 Saiki et al. ................ 192/12 R
6,193,040 B1 * 2/2001 Cerny ......................... 192/200
6,234,904 B1 * 5/2001 Kawaguchi et al. ........ 192/56.5
6,247,902 B1 * 6/2001 Obayashi et al. ............ 417/223

FOREIGN PATENT DOCUMENTS

JP          1-169619          11/1989

* cited by examiner

Primary Examiner—Thomas R. Hannon
Assistant Examiner—Marcus Charles
(74) Attorney, Agent, or Firm—Foley & Lardner

(57) ABSTRACT

A device includes a power-transmission pulley rotatably mounted on an automotive accessory housing, a drive plate fixedly connected to a rotating shaft of the accessory, and shear pins which connect the pulley and the drive plate. The shear pins each have a notched portion and a flanged portion which is offset from the notched portion and which is sandwiched between the pulley and the drive plate. The diameter of shear-pin insertion holes formed in the drive plate is larger than the shear pins which are fixedly connected to the pulley. The shear pins are fixedly connected to the drive plate.

6 Claims, 4 Drawing Sheets

MECHANICAL DEVICE FOR TRANSMITTING POWER

TECHNICAL FIELD

The present invention relates to a mechanical device for transmitting power, and particularly to such a power-transmission device with a shear pin which is designed to fail at a predetermined force in order to protect automotive accessories such as a compressor of an automotive air conditioning system.

BACKGROUND ART

As is generally known, a shear pin is often provided in a fuse design to hold parts in a fixed relationship until excessive force or excessive torque is exerted on one or more of the parts which cause shearing of the shear pin, and also used as a safety device in a power train to protect a mechanism. One such a power-transmission device with shear pins has been disclosed in Japanese Utility Model Provisional Publication No. 1-169619. In the Japanese Utility Model Provisional Publication No. 1-169619, a power-transmission member is fixedly connected to a rotating member integrally connected to a shaft end of a rotating shaft of an automotive accessory through a plurality of shear pins, so that the shear pins are sheared when excessive load is exerted on the automotive accessory, in order for the shear pins to permit the power-transmission member to freely rotate and thus to prevent the automotive accessory to be damaged. As shear pins functioning as a simple and reliable overload limiter, a shearable connecting structure constructed by notched bolts and nuts is often used. Each of the notched bolts has a circumferentially notched portion at coupled faces of the rotating member and the power-transmission member. The notched bolts serve as shear pins. When assembling, the nuts are screwed onto the respective notched bolts to add a joining force in an axial direction of each of the bolts and to couple the rotating member with the power-transmission member by means of the notched bolts and nuts. For easy assembling of the rotating member and power-transmission member, a bolt insertion hole machined in each of these members must be dimensioned to be somewhat larger than an outside diameter of the external threaded portion of each of the notched bolts. However, when the notched bolts are inserted into the respective bolt insertion holes, each having an inside diameter larger than the outside diameter of the notched bolt, and then the rotating member and the power-transmission member are assembled to each other by means of the notched bolts and nuts, there is a considerable dimensional divergence in an aperture among each set of notched bolt and associated bolt insertion hole, which aperture dimension is measured in a direction of rotation of the rotating member and power-transmission member. In presence of excessive load applied to the accessory, there is an increased tendency for a shearing force to be exerted ununiformly on the notched portion of each bolt. In the power-transmission device as described in the Japanese Utility Model Provisional Publication No. 1-169619, owing to unbalanced load arising from the ununiform shearing forces applied to the notched portions of the bolts, an intended shearing performance, that is, an intended torque-limiter performance cannot be assured. Additionally, if the notched bolt serving as a shear pin and the associated nut are tightened with excessive torque greater than a specified tightening torque, the excessive tightening torque acts to prevent the rotating member from displacing relative to the power-transmission member in the rotational direction when excessive load is applied to the automotive accessory. The tightening forces acting in the axial directions of the bolts also act on the respective notched portions, thus exerting a bad influence on the intended shearing performance.

SUMMARY OF THE INVENTION

Accordingly, it is an object of the invention to provide a mechanical device for transmitting power, which avoids the aforementioned disadvantages.

It is another object of the invention to provide a shear-pin equipped power-transmission device for use in a power train of an automotive accessory such as an air-conditioning compressor, which is capable of ensuring easy assembly without sacrificing an intended shearing performance of the shear pin.

In order to accomplish the aforementioned and other objects of the present invention, a mechanical device for transmitting power comprises a power-transmission member rotatably mounted on a housing of an automotive accessory so that the power-transmission member is arranged concentrically with respect to a rotating shaft of the automotive accessory, a rotating member fixedly connected to a shaft end of the rotating shaft and arranged to be opposite to the power-transmission member in an axial direction of the rotating shaft, a plurality of shear pins via which the power-transmission member and the rotating member are joined to each other, a first member of the power-transmission member and the rotating member, to which the shear pins are fixedly connected, a second member of the power-transmission member and the rotating member having a portion defining a plurality of shear-pin insertion holes, an inside diameter of each of the shear-pin insertion holes being dimensioned to be larger than an outside diameter of each of the shear pins, each of the shear pins having a notched portion between opposing faces of the power-transmission member and the rotating member, and a flanged portion formed on an outer periphery thereof at a position being offset from the notched portion toward the second member and interleaved between the power-transmission member and the rotating member so that the notched portion adjoins the flanged portion and that both side walls of the flanged portion abut the opposing faces of the power-transmission member and the rotating member, and the second member being engaged with the shear pins through the shear-pin insertion holes, and fixedly connected to the shear pins by applying a tightening force in an axial direction of each of the shear pins between a protruded end portion of each of the shear pins projecting outside of the shear-pin insertion holes and an associated one of the flanged portions of the shear pins. It is preferable that each of the shear pins has an external threaded portion formed on the protruded end portion, so that the second member is fixedly connected to the first member via the shear pins by tightening a nut screwed onto the external threaded portion. Alternatively, the second member may be fixedly connected to the first member via the shear pins by caulking the protruded end portion of each of the shear pins. The rotating member may comprise a drive plate fixedly connected to the shaft end of the rotating shaft of the automotive accessory, and the drive plate may comprise a first plate fixed to the shaft end of the rotating shaft, a second plate located on an outer periphery of the first plate and integrally connected to the power-transmission member via the shear pins, and a damper rubber through which the first and second plates are integrally connected to each other. It is more preferable that the flanged portion is cylindrical in shape and the notched portion is frusto-conical in shape so that the smallest-diameter portion of the frusto-conical notched portion adjoins one side wall of the flanged portion facing the first member. Preferably, the damper rubber has a substantially ring shape. The damper rubber has a radially inwardly extending brim or flange portion and a radially outwardly extending brim or flange portion. The radially inwardly extending flange portion of the ring-shaped damper rubber is partly provided in an aperture defined between opposing faces of the first plate and the first member, whereas the radially outwardly extending flange portion of the ring-shaped damper rubber is partly provided in an aperture defined between opposing faces of the second plate and the first member, and whereby the second member is in elastic-contact with the first member via the flange portions of the ring-shaped damper rubber, for power-train torque-shock reduction.

The other objects and features of this invention wil become understood from the following description with reference to the accompanying drawings.

DESCRIPTION OF THE PREFERRED EMBODIMENTS

Figure 1:
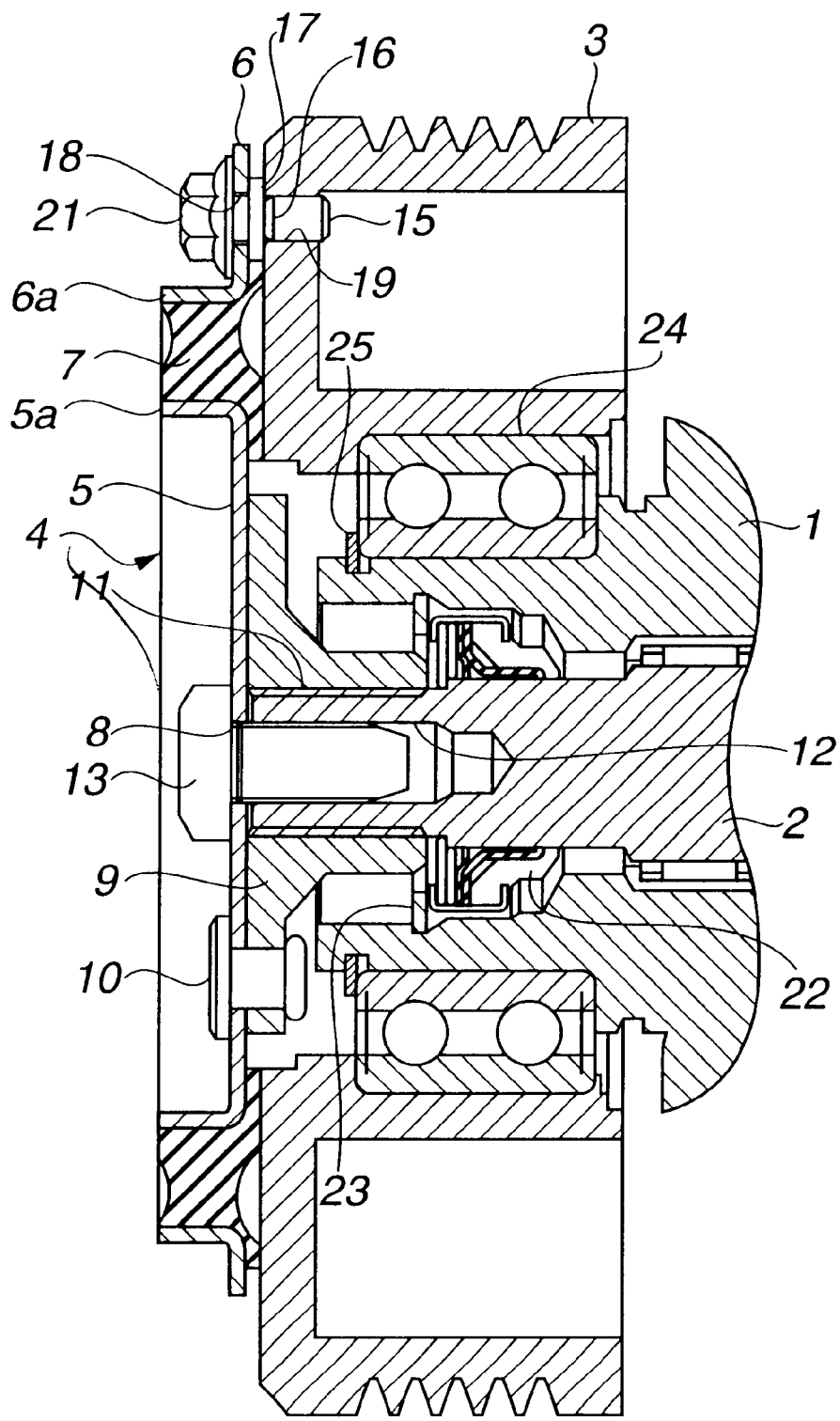
FIG. 1 is a longitudinal cross-sectional view illustrating one embodiment of a shear-pin equipped power-transmission device of the invention.
Figure 2:
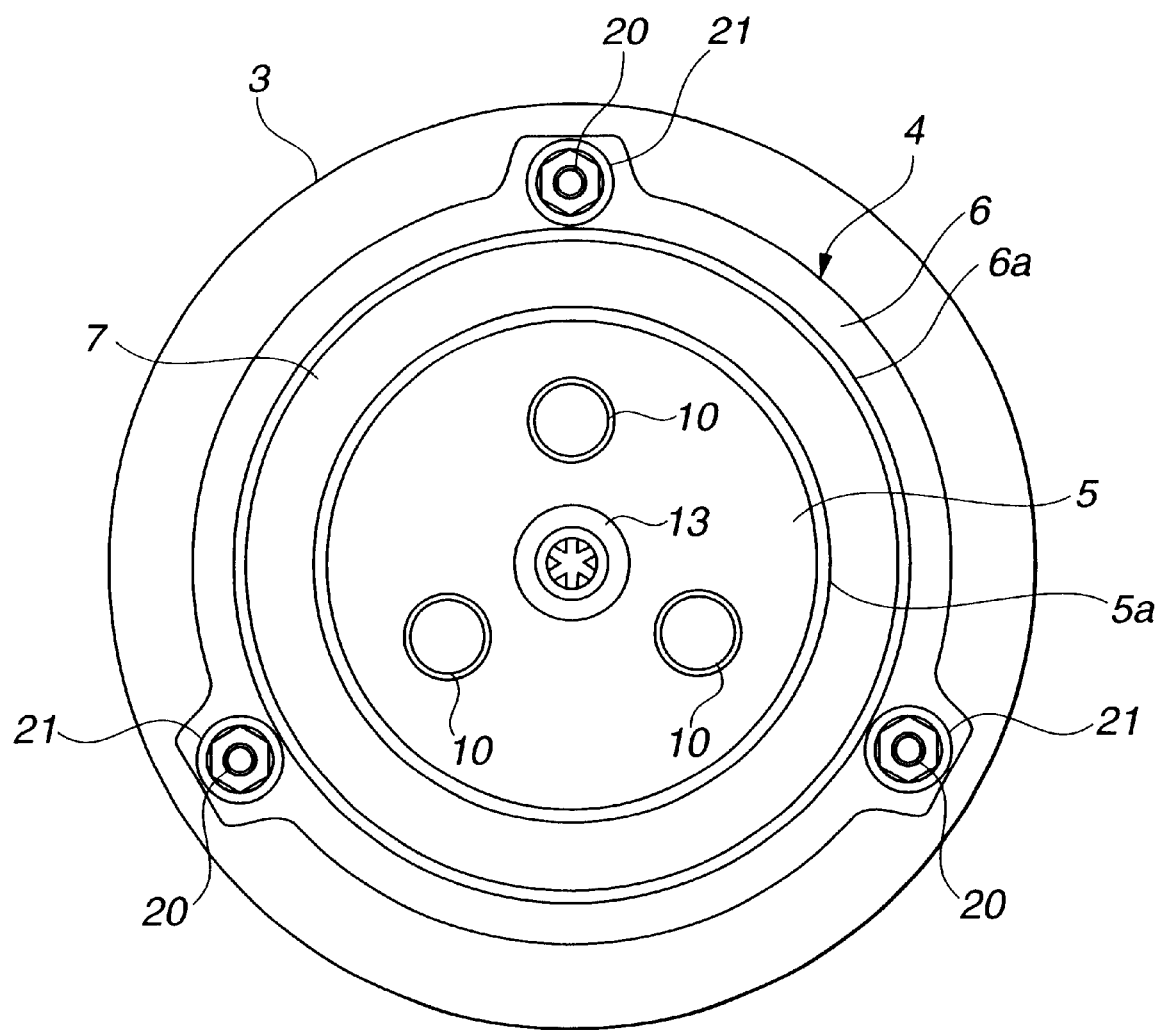
FIG. 2 is a side view illustrating the shear-pin equipped power-transmission device of the embodiment shown in FIG. 1.

Referring now to the drawings, particularly to FIGS. 1 and 2, the shear-pin equipped power-transmission device of the invention is exemplified in an automotive air-conditioning compressor corresponding to one of automotive accessories. A pulley 3 is rotatably mounted on one shaft end of a rotating shaft (or a compressor shaft) 2 of a compressor housing 1 by means of a ball bearing 24. The outer race of ball bearing 24 is press-fitted into the inner periphery of the pulley 3, while the inner race of ball bearing 24 is fitted onto the one shaft end of the rotating shaft 2. A snap ring 25 is put in an annular groove in the compressor housing 1 to prevent axial movement of the inner race of ball bearing 24 and to retain the ball bearing 24 in place. The pulley 3 serves as a power-transmission member and is arranged concentrically with respect to the axis of the rotating shaft 2 of the compressor. A drive plate 4 (a rotating member) is installed on the one shaft end of the rotating shaft 2 so that, as viewed from FIG. 1, the left-hand side wall surface of the drive plate 4 faces the right-hand side wall surface of the pulley 3, such that the drive plate 4 is opposite to the pulley 3 in the axial direction of the rotating shaft 2. As shown in FIGS. 1 and 2, the drive plate 4 is comprised of a first plate 5 fixed to the shaft end of the rotating shaft 2, and a second plate 6 integrally connected to the first plate 5 through a damper rubber 7 in such a manner as to surround the outer periphery of the first plate 5. As shown in FIG. 1, the second plate 6 is integrally connected to the power-transmission member (the pulley 3) via the shear pins (15, 15, 15). The damper rubber 7 is adhered to both an axially-extending, substantially 90°-bent, annular flanged edge portion 5a formed at the outer periphery of the first plate 5 and an axially-extending, substantially 90°-bent, annular flanged edge portion 6a formed at the inner periphery of the second plate 6 by way of vulcanization. As clearly seen from the cross section of FIG. 1, the damper rubber 7 has a substantially ring shape. In a sectional view of the substantially ring-shaped damper rubber 7 in its radial direction, the damper rubber 7 has a substantially hat-shape in partial cross section. A radially inwardly extending brim or flange portion of the ring-shaped damper rubber 7 is partly provided in a narrow aperture defined between the opposing faces of the first plate 5 and the pulley 3. A radially outwardly extending brim or flange portion of the ring-shaped damper rubber 7 is partly provided in a narrow aperture defined between the opposing faces of the second plate 6 and the pulley 3. Thus, the drive plate 4 (the first and second plates 5 and 6) is in elastic-contact with the left-hand side wall of the pulley 3 via the inwardly and outwardly extending flange or brim portions of the ring-shaped damper rubber 7. This contributes to attenuation in torque shock in the automotive power train. As shown in FIG. 1, the first plate 5 is formed at its center with a bolt insertion hole 8. A boss member 9 is arranged concentrically with respect to the axis of the bolt insertion hole 8 and riveted to the right-hand side wall of the first plate 5 by means of a plurality of rivets (circumferentially equi-distant spaced three rivets 10 in the shown embodiment). The boss member 9 is engaged with the shaft end of the rotating shaft 2 via a spline-connection means 11 in a manner so as to prevent relative rotation of the boss member 9 on the shaft end of the rotating member 2 and to allow axial movement of the boss member 9 relative to the rotating shaft 2. Actually, the spline-connection means 11 includes internal splines formed on the inner periphery of the boss member 9 and external splines formed on the outer periphery of the shaft end of the rotating shaft 2. By screwing a bolt 13 through the central bolt insertion hole 8 into a tapped hole 12 formed in the rotating shaft end until a tightening torque for the bolt 13 reaches a specified tightening torque, the drive plate plus boss member is fixedly connected to the rotating shaft end. As can be appreciated from FIGS. 1 and 2, the second plate 6 and the pulley 3 are joined or connected to each other via a plurality of shear pins (three shear pins 15 in the shown embodiment). The shear pins (15, 15, 15) are fixedly connected to or press-fitted into respective shear-pin mounting holes (19, 19, 19) formed in the pulley 3. Each of the shear pins 19 is formed with a notched portion 16 and a flanged portion 17. With the shear pin 15 installed at a coupling portion between the pulley 3 and the second plate 6 of drive plate 4, the notched portion 16 of shear pin 15 is located between the opposing faces of pulley 3 and second plate 6. The flanged portion 17 is formed on the outer periphery of shear pin 15 at a position being slightly offset from the notched portion 16 toward the drive plate 4 in the axial direction of the shear pin, so that the notched portion 16 adjoins the flanged portion 17 and that both side walls of the flanged portion 17 abut the left-hand side wall surface of the pulley 3 and the right-hand side wall surface of the second plate 6, respectively. In more detail, the flanged portion 17 is cylindrical in shape, whereas the notched portion 16 is frusto-conical in shape and thus formed in a frusto-conical fashion in such a manner as to adjoin the right-hand side wall of the flanged portion 17. The smallest-diameter portion of the frusto-conical notched portion 16 is located on a plane corresponding to the right-hand side wall surface of the flanged portion 17. On the other hand, the second plate 6 has three shear-pin insertion holes (18, 18, 18) formed therein, so there is a one-to-one correspondence between the installation positions of three shear pins (15, 15, 15) on the pulley 3 and the three shear-pin insertion holes (18, 18, 18) formed in the second plate 6. Each of the shear-pin insertion holes (18, 18, 18) is dimensioned so that the inside diameter of the shear-pin insertion hole is slightly larger than the outside diameter of the shear pin 15 except both the notched portion 16 and the flanged portion 17. As described in detail hereunder, the second plate 6 is engageable with the shear pins (15, 15, 15) through the shear-pin insertion holes (18, 18, 18), and the second plate 6 is fixedly connected to the pulley 3 by applying a tightening force in the axial direction of each shear pin 15 between a protruded end portion of each of the shear pins (15, 15, 15) projecting outside of the respective shear-pin insertion holes (18, 18, 18) and an associated one of the flanged portions (17, 17, 17). Actually, in the embodiment shown in FIGS. 1 and 2, an external threaded portion 20 is formed on each of the protruded end portions of the shear pins (15, 15, 15) projecting from the respective shear-pin insertion holes (18, 18, 18). By screwing a nut 21 on the external threaded portion 20, the second plate 6 and the pulley are fixedly connected to each other. In FIG. 1, a part denoted by reference sign 22 is an oil seal interleaved between the compressor housing 1 and the rotating shaft (compressor shaft) 3. A part denoted by reference sign 23 is a snap ring which retains the oil seal 22 in place.

In the previously-described structure of the shear-pin equipped power-transmission device of the embodiment, the shear-pin insertion hole 18 provided in the drive plate 4 (in particular, the second plate 6) is formed to have a larger diameter in comparison with the outside diameter of the shear pin 15, and thus it is possible to absorb machining errors for the shear-pin insertion holes 18 and installation errors of the shear pins 15. Also, the larger-diameter shear-pin insertion hole 18 ensures easy mounting of the second plate 6 on the three shear pins 15 press-fitted to the pulley 3, thus ensuring easy assembling of the drive plate 4 to the pulley 3. Furthermore, when the drive plate 4 is fixedly connected to the pulley 3 by screwing the nut 21 onto the external threaded portion 20 formed on each protruded end portion of shear pin 15, the tightening force for the external threaded portion 20 acts between the protruded shear pin end and the flanged portion 17 of shear pin 15 in the axial direction of the shear pin. According to the shear pin structure of the embodiment, note that the tightening force does not act on the notched portion 16 of shear pin 15 as a tensile load. Therefore, it is possible to securely engage the shear pin 15 with the drive plate 4 by tightening the nuts (21, 21, 21) with a comparatively high tightening force (tightening torque), so that there is no relative rotation (no relative displacement) of the shear pin 15 to the drive plate 4. As a result, even when there is a considerable dimensional divergence in the aperture among each set of notched shear pin and shear-pin insertion hole, which aperture dimension is measured in a direction of rotation of the rotating member (the drive plate 4) and power-transmission member (the pulley 3) after the notched shear pins (15, 15, 15) are inserted into the respective shear-pin insertion holes (18, 18, 18) and then the drive plate 4 and the pulley 3 are assembled to each other by means of the notched shear pins (15, 15, 15) and nuts (21, 21, 21), the presence of these uneven apertures does not exert a bad influence upon the intended shearing performance of the shear pins. Thus, in the shear-pin equipped power-transmission device of the embodiment, it is possible to reconcile or balance two contradictory requirements, that is, easy assembling based on large-diameter shear-pin insertion holes 18 and reliable overload limiter (an intended shearing performance). Additionally, the previously-described flanged portion 17 also functions to easily and accurately position the shear pin 15 with respect to the left-hand side wall face of the pulley 3 by way of abutment between the right-hand side wall surface of the flanged portion 17 and the left-hand side wall surface of the pulley 3 when the shear pins 15 are press-fitted into the respective shear-pin mounting holes 19 of the pulley 3. This ensures easy assembling of the shear pins (15, 15, 15) on the pulley 3. Moreover, according to the shear-pin equipped power-transmission device of the embodiment, the drive plate 4 is constructed by three components, namely the first plate 5 fixed to the rotating shaft 2, the second plate 6 connected through the shear pins (15, 15, 15) to the pulley 3 in a manner so as to surround the outer periphery of the first plate 5, and the damper rubber 7 through which the first and second plates 5 and 6 are resiliently connected to each other. By means of the damper rubber 7, it is possible to effectively absorb or attenuate torque shock arising from positive and negative fluctuations in rotation of the automotive power train.

Figure 3:
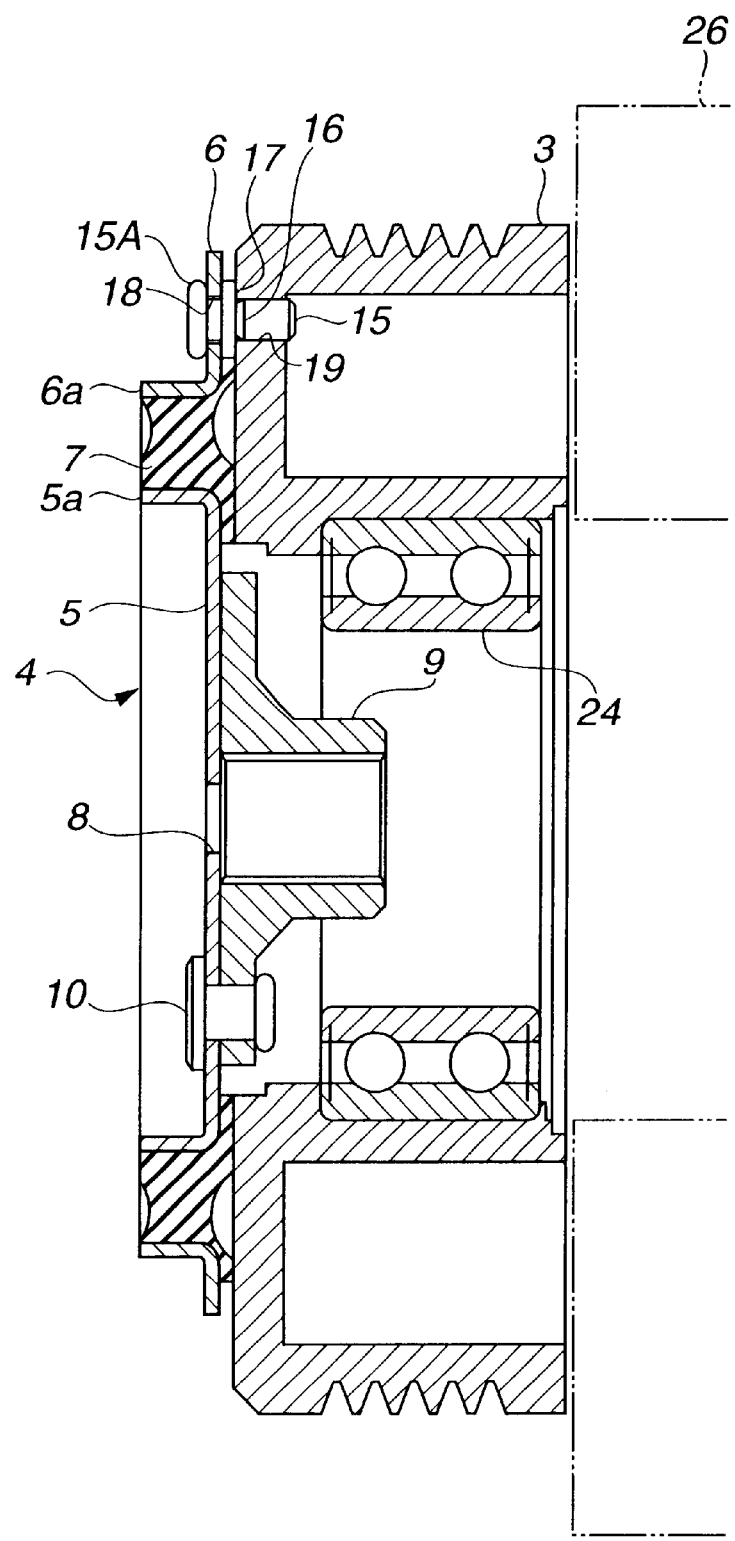
FIG. 3 is a longitudinal cross-sectional view illustrating a sub-assembly of a pulley 3 and a drive plate 4 in a slightly-modified shear-pin equipped power-transmission device of the invention, under a condition in which a housing 1 of an automotive accessory and a rotating shaft 2 are disassembled.
Figure 4:
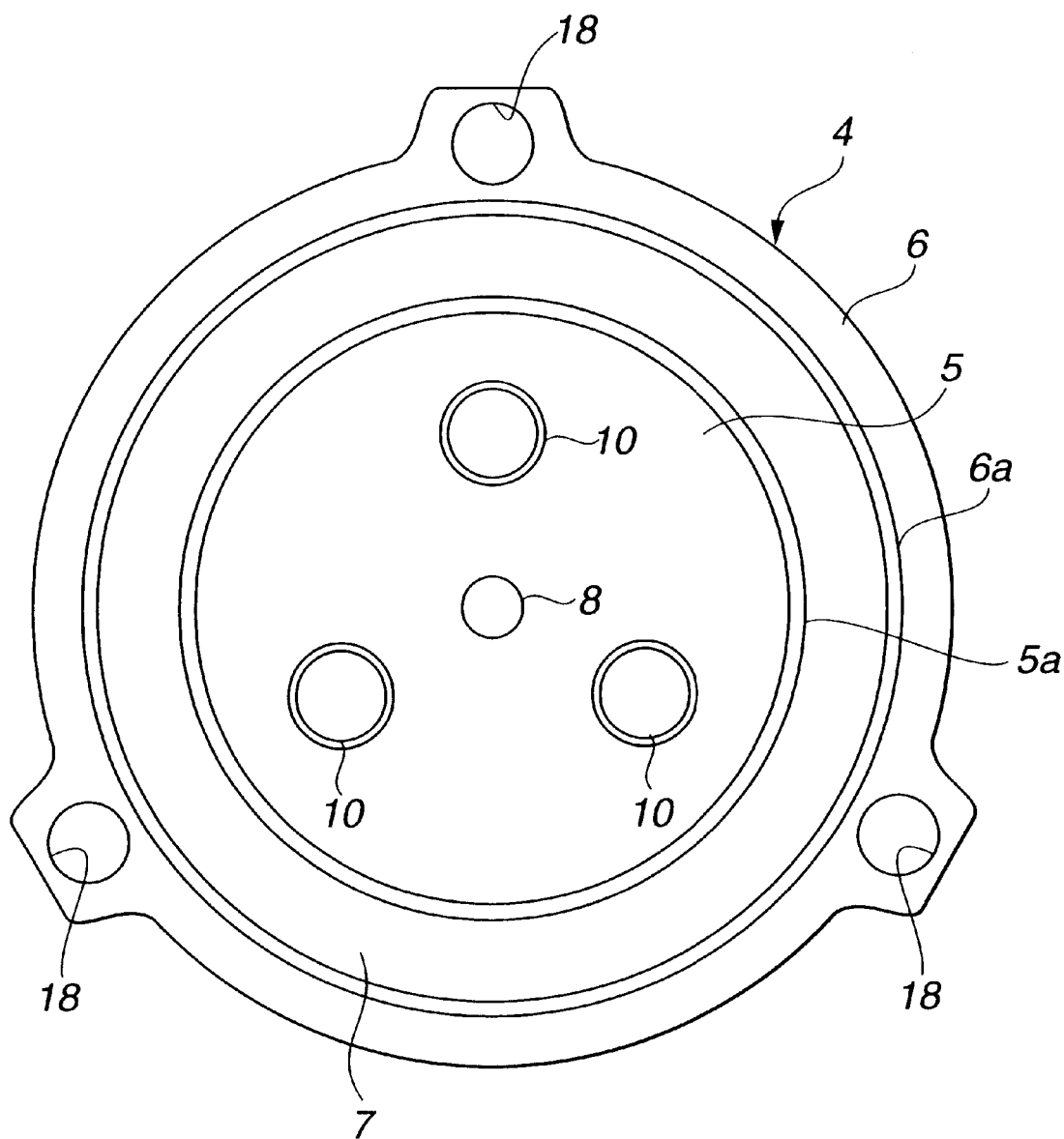
FIG. 4 is a side view illustrating the drive plate 4 of the modified shear-pin equipped power-transmission device shown in FIG. 3.

In the embodiment shown in FIGS. 1 and 2, in order to secure the second plate 6 of drive plate 4 onto the shear pins (15, 15, 15), the nuts (21, 21, 21) are screwed onto the respective external threaded portions (20, 20, 20) of the protruded shear-pin end portions. In lieu thereof, as shown in FIGS. 3 and 4, the second plate 6 may be fixedly connected to the shear pins (15, 15, 15) by caulking the protruded pin ends of the shear pins (15, 15, 15) (see the caulked portion 15A shown in FIG. 3) and by crimping the second plate 6 between the caulked portion 15a and the flanged portion 17 of shear pin 15. In this case, as can be seen from the phantom line (two-dotted line) shown in FIG. 3, generally, such a caulking process is achieved while putting a jig 26 on the right-hand side wall surface of the pulley 3. Such a caulking force never acts on the damper rubber 7, and thus the caulking process can be securely certainly achieved. The simple fastening means as discussed above, that is, a bolt-nut joint method or a caulked joint method is easy in joining work.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A mechanical device for transmitting power comprising:
    a power-transmission member rotatably mounted on a housing of an automotive accessory so that the power-transmission member is arranged concentrically with respect to a rotating shaft of the automotive accessory;
    a rotating member fixedly connected to a shaft end of the rotating shaft and arranged to be opposite to the power-transmission member in an axial direction of the rotating shaft;
    a plurality of shear pins via which the power-transmission member and the rotating member are joined to each other;
    a first member of the power-transmission member and the rotating member, to which the shear pins are fixedly connected;

a second member of the power-transmission member and the rotating member having a portion defining a plurality of shear-pin insertion holes, an inside diameter of each of the shear-pin insertion holes being dimensioned to be larger than an outside diameter of each of the shear pins;

each of the shear pins having a notched portion between opposing faces of the power-transmission member and the rotating member, and a flanged portion formed on an outer periphery thereof at a position being offset from the notched portion toward the second member and interleaved between the power-transmission member and the rotating member so that the notched portion adjoins the flanged portion and that both side walls of the flanged portion abut the opposing faces of the power-transmission member and the rotating member; and the second member being engaged with the shear pins through the shear-pin insertion holes, and fixedly connected to the shear pins by applying a tightening force in an axial direction of each of the shear pins between a protruded end portion of each of the shear pins projecting outside of the shear-pin insertion holes and an associated one of the flanged portions of the shear pins.

2. The mechanical device for transmitting power as claimed in claim 1, wherein each of the shear pins has an external threaded portion formed on the protruded end portion, so that the second member is fixedly connected to the first member via the shear pins by tightening a nut screwed onto the external threaded portion.

3. The mechanical device for transmitting power as claimed in claim 1, wherein the second member is fixedly connected to the first member via the shear pins by caulking the protruded end portion of each of the shear pins.

4. The mechanical device for transmitting power as claimed in claim 1, wherein the flanged portion is cylindrical in shape and the notched portion is frusto-conical in shape so that the smallest-diameter portion of the frusto-conical notched portion adjoins one side wall of the flanged portion facing the first member.

5. The mechanical device for transmitting power as claimed in claim 1, wherein the rotating member comprises a drive plate fixedly connected to the shaft end of the rotating shaft of the automotive accessory, and the drive plate comprises a first plate fixed to the shaft end of the rotating shaft, a second plate located on an outer periphery of the first plate and integrally connected to the power-transmission member via the shear pins, and a damper rubber through which the first and second plates are integrally connected to each other.

6. The mechanical device for transmitting power as claimed in claim 5, wherein the damper rubber has a substantially ring shape, and the damper rubber has a radially inwardly extending flange portion and a radially outwardly extending flange portion, and wherein the radially inwardly extending flange portion of the ring-shaped damper rubber is partly provided in an aperture defined between opposing faces of the first plate and the first member and the radially outwardly extending flange portion of the ring-shaped damper rubber is partly provided in an aperture defined between opposing faces of the second plate and the first member, and whereby the second member is in elastic-contact with the first member via the inwardly and outwardly extending flange portions of the ring-shaped damper rubber.

\* \* \* \* \*